S. S. NEWTON,

Assignor to S. S. NEWTON & Co.

Stopper for Mucilage Holders.

No. 9,599. Reissued March 8, 1881.

*Witnesses:*

W. B. Masson.

H. P. Low

*Inventor:*

Stephen S. Newton

Doubleday & Bliss atty.

N. PETERS, PHOTO-LITHOGRAPHER, WASHINGTON, D. C.

UNITED STATES PATENT OFFICE.

STEPHEN S. NEWTON, OF BINGHAMTON, NEW YORK, ASSIGNOR TO S. S. NEWTON & CO., OF SAME PLACE.

STOPPER FOR MUCILAGE-HOLDERS.

SPECIFICATION forming part of Reissued Letters Patent No. 9,599, dated March 8, 1881.

Original No. 193,024, dated July 10, 1877. Application for reissue filed November 20, 1880.

*To all whom it may concern:*

Be it known that I, STEPHEN S. NEWTON, a citizen of the United States, of Binghamton, in the county of Broome and State of New York, have invented certain new and useful Improvements in Stoppers for Mucilage-Holders; and I do hereby declare the following is a full, clear, and exact description of the invention, that will enable others skilled in the art to which it appertains to make and use the same, reference being had to the accompanying drawings, and to letters of reference marked thereon, which form a part of this specification.

Figure 2:
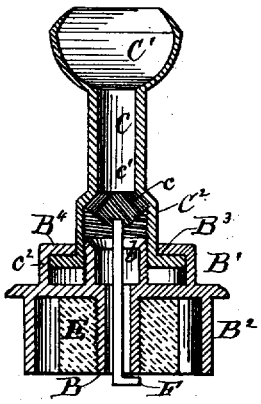
Figure 1:
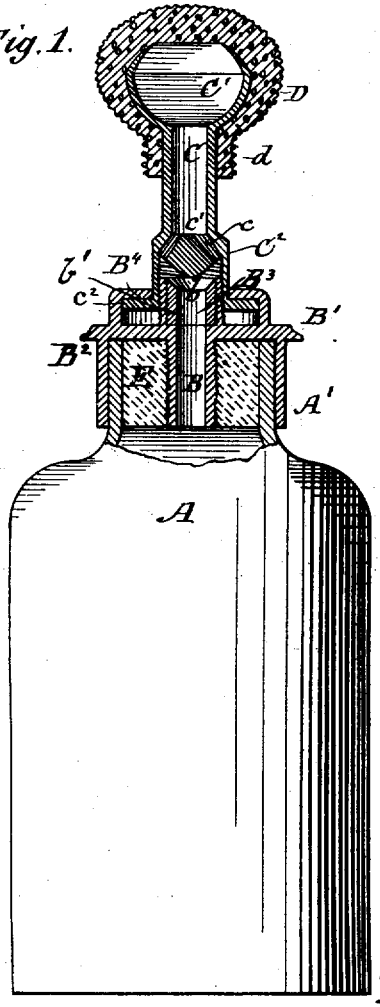

Figure 1 is an elevation, partly in section, of a bottle having my improvement applied thereto, and Fig. 2 shows a modification of the same.

A is the body of a bottle, and A′ the neck, of any desired material, and of any configuration which may be adapted to receive the stopper.

B $B^3$ is the central discharging-tube, mounted in a cap-plate, B, and cast in one and the same piece therewith.

$B^2$ is a flange projecting downwardly from the cap-plate, and fitting closely the outside of the neck A′.

E is a plug, of cork or other suitable material, filling the annular space between the part B of the tube and the inside of the bottle-neck, the tube being, by preference, screwed into the plug.

It will be seen that the neck A′ of bottle is cylindrical in form, and of uniform external and internal diameter, whereby the plug E can be fitted accurately to the inside and the flange $B^2$ can be fitted closely to its outside.

In practice I make the plug to fit so closely to the bottle and the tube as to prevent leakage, the object of the depending flange $B^2$ being only to cover up the plug and prevent it from being seen, thus ornamenting the bottle.

From an examination of the drawings, it will be seen that this flange $B^2$ extends down to a line with the lower end of the plug E, and thus hides the plug from view, and being made of metal its exterior can be burnished and made to add very much to the finish and appearance of the bottle.

I do not claim, broadly, a metal flange or band upon the outside of a bottle-neck, as this is admitted to be old; but I believe I am the first to combine such a metal cap and flange with an internal elastic stopper-plug, which secures the entire stopper to a bottle having a neck of uniform internal and external diameter—that is, without a lip on the outside, the elastic plug serving, in addition, to prevent leakage around the discharging-tube.

The upper end, $B^3$, of the discharging-tube, is also screw-threaded externally and internally, and has a valve-seat, *b*.

*b′* is a supplemental elastic or yielding packing or seat inserted within the upper end of the discharging-tube. In consequence of its being made of rubber or other equivalent material, it can be screwed on the threaded end of the tube, and will keep its place firmly, but can be easily removed or adjusted vertically.

The sponge-carrier consists of an upper section, C, of a tube carrying a bulb C′, and a lower enlarged tubular section, $C^2$, which is screw-threaded internally to engage with the upper end, $B^3$, of the discharging-tube.

*c* is a globular or conical valve arranged in the upper end of the tube-section, $C^2$, and fits the valve-seat *b*.

*c′* are ports above the valve *c* to permit the passage of fluid.

The upper end of the sponge-holder, which is expanded into a cup-shaped cavity or bulb, serves the double purpose of forming a large opening for the delivery of liquid to the sponge D, and of facilitating, in consequence of its external shape, the securing of the sponge in proper position.

$c^2$ is a flange projecting outwardly from the lower end of the tube-section, $C^2$. $B^4$ is a corresponding flange rising from the cap-plate B′, and fitting closely the outside of the tube-section $C^2$. The distance between the lower face of the flange $B^4$ and the upper face of the cap-plate B′, is such as to permit sufficient vertical movement of the sponge-support to open and close the valve *c*, as will be readily understood from an examination of Fig. 1 without further explanation.

In Fig. 2 a stem or shank, F, projects from the valve *c* down through the discharge-tube, its lower or inner end being bent at a right angle, as shown, so that it engages with the inner end of said tube, and serves as a stop to limit the upward movement of the sponge-holder in substantially the same manner as do the flanges $c^3$ $B^4$ in Fig. 1.

One of the advantages incident to constructing the tube-section $C^2$ of the sponge-holder to go over the upper end of the discharging-tube is the increased size of which the ports $c'$ and the space around the valve $c$ can be made; and this advantage is quite important when the bottle is to be used for some purposes—as, for instance, liquid blacking—because it is in such cases desirable that the valve should be attached to and be operated by the sponge-holder to insure that the valve shall be lifted from its seat by the positive action of the screw-threads. Otherwise the liquid would sometimes "set" the valve, and thereby prevent the discharge of the liquid from the bottle. This attaching the valve to the sponge-support necessitates the use of ports $c'$, and as such liquids contain more or less sediment, or from other causes do not flow freely, it is very desirable that the size of these ports be increased, as has been explained.

What I claim is—

1. In a bottle-stopper, the combination, with the externally-screw-threaded discharging-tube, provided with an opening at its upper end, of a rising and falling internally-screw-threaded section of a tube, having an internal valve attached centrally thereto, adapted to close the upper end of the discharge-tube, and a side port or side ports adapted to permit liquid to pass around the valve, substantially as set forth.

2. The combination, with the externally-screw-threaded discharging-tube, having an opening at its upper end, of a rising and falling screw-threaded section of the tube mounted on the upper end of the discharging-tube, and having a discharge-port, and having an interior valve formed centrally therein, and a stop which limits the upward movement of the last said tube-section, substantially as set forth.

3. In a bottle-stopper, the combination, with the tubes $B^3$ C, the valve $c$, and the valve-seat, of the flanges $c^2$ and $B^4$, substantially as set forth.

4. The sponge-holder consisting of the tube C $C^2$, expanded at its upper end into the hollow bulb $C'$, in combination with the sponge D, secured to the outside of the bulb, substantially as set forth.

In testimony whereof I affix my signature in presence of two witnesses.

STEPHEN S. NEWTON.

Witnesses:

NERI PINE,

SOLON CONKLIN.